Dec. 31, 1929.　　　W. M. THOMAS　　　1,741,386
APPARATUS FOR PHOTOGRAPHICALLY MARKING FILM DURING THE EXPOSING THEREOF
Filed April 1, 1925
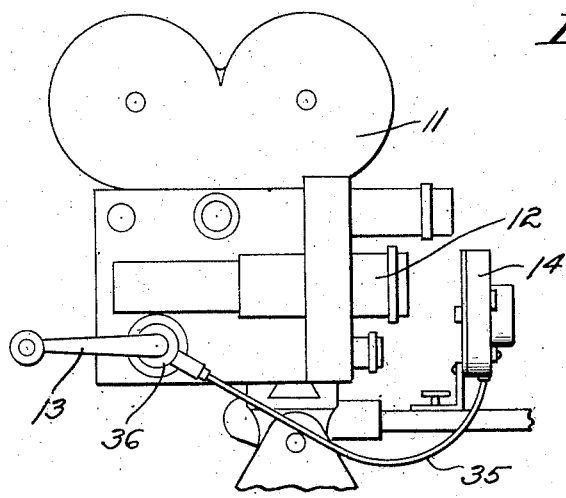
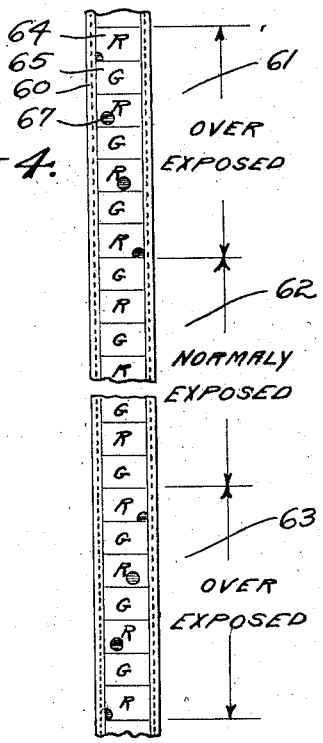
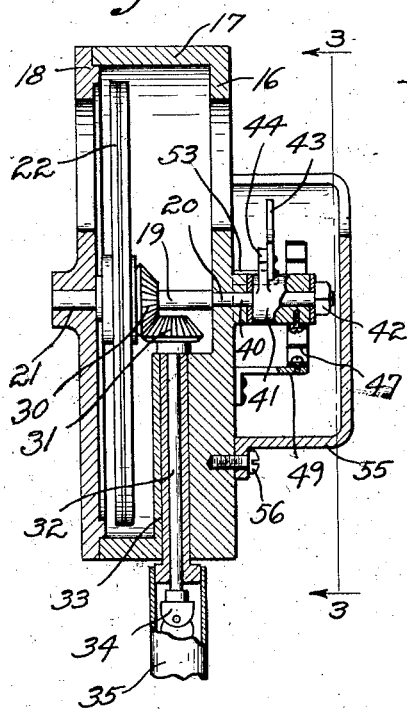
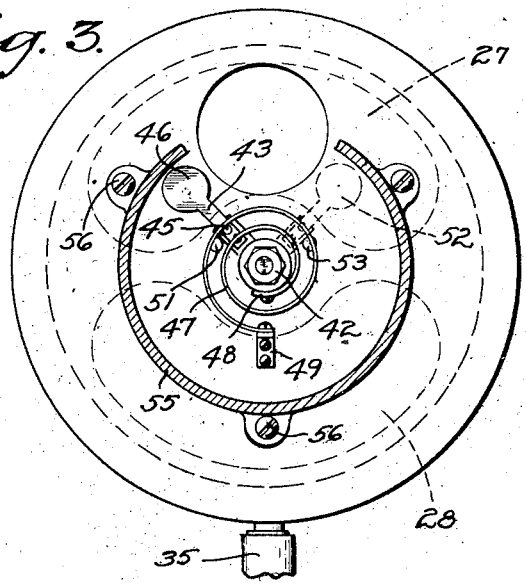
INVENTOR:
WILLIAM M. THOMAS.
By
ATTORNEY.

Patented Dec. 31, 1929

1,741,386

UNITED STATES PATENT OFFICE

WILLIAM M. THOMAS, OF LOS ANGELES, CALIFORNIA

APPARATUS FOR PHOTOGRAPHICALLY MARKING FILM DURING THE EXPOSING THEREOF

Application filed April 1, 1925. Serial No. 19,845.

My invention relates to marking motion picture film and it is very valuable for marking color film so that different color frames thereof may be easily distinguished.

I am inventor of a method and apparatus by which color motion picture film is produced. These inventions were presented to the Patent Office under the titles of Method of producing color projection, Serial No. 660,968, filed September 5, 1923, and Motion picture camera attachment, Serial No. 660,969, filed September 5, 1923. In these inventions I produce a negative film having alternate frames which are exposed to different color value light impressions. A camera for exposing the negative is provided with a filter disc which has a red filter and a green filter. This disc is placed in front of the objective of the camera and is rotated as the film is moved past the objective inside the camera. The disc is so synchronized with the camera that the red filter is in front of the objective at every alternate frame of the film, and so that the green filter is in front of the objective with every alternate frame of the film; therefore, one frame of the film will receive red color value light impressions and the next frame of the film will receive green color value light impressions. After the negative film has been exposed, it is developed. Positives are made therefrom which are cut and spliced. Great care must be exercised in the splicing of the film because the alternate order of the red and green color value frames must be preserved. It is very difficult to make a distinction between the red and green color value frames because they are so similar. The film, therefore, in splicing, must be carefully examined so that its frames may be properly arranged.

To eliminate a possibility of error by mistaking one frame for another and to save time, I have invented a device for marking either the red or the green color value frames of the film so that they may be quickly observed. This invention was presented to the Patent Office in an application entitled Method of and apparatus for marking film, filed April 1, 1925, Serial No. 19,846. In this invention I illustrated a device in which the film is placed and in which every alternate frame is marked so that it may be identified. The operator of this device must be very careful, however, to properly set the frame therein so that it will mark the intended color value frames. I prefer to mark the red color value frame of the film in all instances.

It is an object of this invention to provide an apparatus for marking film during the exposure thereof. This distinguishes the different frames and eliminates any error in placing the film in the device of my other invention for a complete marking.

It is a further object of my invention to provide an apparatus for marking film, during the exposure thereof, at the start and finish of each actuation of the camera.

When a camera is put into operation, the film is accelerated until it reaches its normal travelling speed, and when the camera is cessated, the film retards in speed until it stops; therefore, at the start and at the finish of an operation of the camera, there will be an overexposed portion which, of course, is cut out when the film is spliced, there being a normally exposed portion between these overexposed portions, which is utilized.

In utilizing my invention I mark preferably the red color value frames of these overexposed portions at each end of the normal exposed portion. In this manner I mark the film so that it may be properly set up in the marking device of my other invention without marking the normally exposed and utilizable portion of the film.

The device of my invention has a flag member which is adapted to swing across the path of the objective of the camera during an acceleration of the camera and during a retardation thereof. This flag is preferably placed on a shaft which rotates when the camera is operated. The friction between the flag and the shaft is such that when the shaft is rotating at a normal speed, corresponding to the normal speed of the camera, the flag will be swung entirely across the path of the objective of the camera, engaging a stop pin. Therefore, as the camera is brought into operation and accelerates to normal speed, the flag will be swung across the path of the objective by the friction between the flag and the shaft on which it is mounted. I provide a means in the form of a spring for returning the flag to normal position when the friction between the flag and the shaft decreases, a decrease in friction occurring as the camera is stopped.

Other objects and advantages of the invention will be made evident hereinafter.

Referring to the drawing in which I illustrate a preferred form of my invention—

Fig. 1 is a view illustrating the utility of my invention.

Fig. 2 is an enlarged vertical sectional view taken through a camera filter attachment having a device of this invention incorporated therein.

Fig. 3 is a sectional view taken as indicated by the line 3—3 of Fig. 2.

Fig. 4 is a diagrammatic view of a film showing the manner in which it is marked by the apparatus of my invention.

With reference to Fig. 1, I show a camera 11 having an objective 12 through which light impressions are conveyed to a film, passing thereby inside the camera 11. The camera 11 is operated by a crank 13, as shown. In front of the objective 12 is placed a camera attachment 14 which has filter screens which adapt the camera 11 for making color film of my invention.

The attachment 14 is clearly shown in Fig. 2 and comprises a housing 16 which provides a cup-shaped member 17 having a cover 18 secured thereto. A shaft 19 journals in the member 17 at 20 and in the cover 18 at 21. Carried on the shaft 19 is a filter disc 22 which, as shown in Fig. 3, carries light filters 27 and 28. The light filter 27 may be a red color filter and the filter 28 may be a green color filter. A bevel gear 30 is carried by the shaft 19 and engages a bevel gear 31 by which the shaft and filter disc are rotated. The gear 31 is secured at the end of a shaft 32 which extends through a bearing 33 of the cup-shaped member 17. The lower end of the shaft 32 is connected with a flexible shaft 34 which extends through a flexible tubing 35. As shown in Fig. 1, the flexible tubing 35 extends to a gear box 36. The gear box 36 has suitable gears therein, not shown, by which the flexible shaft 34 is driven. When the crank 13 is operated, the filter disc 22 is driven in synchronism with the film inside the camera 11.

When one frame of a film is in front of the objective 12, the red color filter 27 is passing across the path of the objective and when the next frame of the film is in front of the objective 12, the green color filter 28 is crossing the path of the objective 12. The red color filter 27 is passing through the path of the objective 12 when every alternate frame of the film is in front of the objective. Likewise, the green color filter is crossing the path of the objective with every alternate frame. These color filters 27 and 28 allow certain light impressions to pass through the objective 12 to the film. This is not, however, a part of the present invention and is fully described in my other applications hereinbefore referred to.

The essence of my invention is clearly shown in Figs. 2 and 3. An end 40 of the shaft 19 is extended to the exterior of the housing 16, as clearly shown in Fig. 2. A hub 41 is placed on the projecting end of the shaft 40, this hub having somewhat of a running fit with respect to the shaft 40. A nut 42 is screwed onto the end of the shaft to retain the hub 41 in place. A flag 43 is secured to an arm 44 of the hub 41 in any suitable manner as by the rivets 45, as shown. The upper end 46 of the flag 43 is circular in shape. This flag 43 is made from a light transmitting material such as celluloid and is preferably green. A spiral clock spring 47 is provided, the inner end 48 thereof connecting with the hub 41 and the outer end thereof connecting to the housing 17 by a suitable clip 49. This spring is provided for the purpose of resiliently retaining the hub 41 and the flag 43 in the position shown in Fig. 3 so that the arm 44 engages a stop pin 51.

The frictional action between the hub 41 and the shaft 40 is such that when the shaft is running at normal speed, the friction will be sufficient to overcome the action of the spring 47 and will move the members 41 and 43 into the dotted line position 52, in which position the arm 44 engages a stop 53. The flag 43, when moved from normal position into the position 52, moves across the path of the objective 12, that is, it moves across the path of light impressions which pass through the objective 12 to the film in the camera. When the camera is put into operation, it accelerates from no movement into a normal movement. As the camera accelerates in operation, the shaft 19 is likewise accelerated in rotation. As the friction between the portion 40 of the shaft 19 and the hub 41 increases, the flag 46 is moved from the position shown in full lines in Fig. 3 into the position shown by the dotted lines 52 of this figure. As long as the camera is operating at normal speed, the flag will be retained in the position 52; however, when the camera is stopped from operation, the rotation of the shaft 19 retards to zero. At this time the opposition against the spring 47 is reduced and the spring will return the flag 46 to normal position, the flag 46 crossing the path of the objective 12.

A guard 55 of a suitable character is secured to the housing 16 of the camera attachment 14 for protecting the exposed parts of my invention, the housing 16 being secured in place by suitable screws 56.

In Fig. 4 I illustrate a typical view of a portion of film. This film, indicated at 60, has an over-exposed portion 61, a normally exposed portion 62 and an over-exposed portion 63, the over-exposed portions 61 and 63 being situated at either side of the normally exposed portion 62. The film 60 has red color value frames 64 and green color value frames 65 which are alternately arranged. The over-exposed portion 61 represents a portion of the film passing in front of the objective 12 when the camera is accelerating to normal speed of operation, and the over-exposed portion 63 represents the portion of the film passing in front of the objective 12 when the camera 11 is retarding in speed.

The flag 43 being of a character that transmits green light will make no appreciable impression on the green frames 65. This is because the light impressions which pass through the green flag 43, when the green filter is crossing the path of the objective, also pass through the green filter 28. However, the flag 43 makes a strong impression on mark 67 on each of the red flames 64 during its movement across the path of the projector 12. This is because at this time light impressions transmitted by the red filter 27 are not transmitted by the green flag 43; therefore, the red frames 64 will have dark marks 67 thereon as the flag passes across the path of the objective. The normally exposed portion 62 of the film is not marked because the flag, by the time the camera reaches the normal speed of operation, is entirely across the path of the objective 12 and is in the position indicated by the dotted lines 52 of Fig. 3.

The negative film, thus exposed and having the red frames thereof marked, is placed in a marking device of my previously mentioned invention and has each red frame thereof marked entirely throughout the film. The operator of this device can quickly distinguish the red frames by the dark marks 67 thereon, and he may quickly place the film in the marking device without a chance of error, due to mistaking a green frame for a red frame.

Marking the film by my invention is not detrimental because it marks those portions of the film which are of no value. The device is simple in construction and operates effectively.

Although I have shown it as a part of the camera attachment 14, it is obvious that it could be made a part of the camera 11. It is not necessary that the flag be situated at the outer end of the objective 12. It is only necessary that it be situated in the path of light impressions which are impressed upon the film 60.

I claim as my invention:

1. In combination: a camera having an objective, there being a film adapted to be moved past said objective during the operation of said camera; marking means arranged to move into the path of light rays moving toward said film from said objective; and mechanism operatively connected to said camera for actuating said marking means only during a change of speed in the operation of said camera.

2. In a film marking device, the combination of: a camera, there being a film carried in said camera adapted to move by the objective of said camera and to receive light impressions through said objective; a filter disc having filters which are arranged to move in the path of said objective for the purpose of controlling color value light impressions propagated to said film; marking means capable of interrupting certain color value light impressions and allowing others to pass, said marking means being adapted to move into the path of said objective; and mechanism operatively connected to said camera for actuating said marking means during the operation of said camera.

3. In a film marking device, the combination of: a camera, there being a film carried in said camera adapted to move by the objective of said camera and to receive light impressions through said objective; a filter disc having filters which are arranged to move in the path of said objective for the purpose of controlling color value light impressions propagated to said film; a light transmitting flag of the same color as one of said filters, said flag being adapted to move across the path of said objective; and mechanism operatively connected to said camera for moving said flag into the path of said objective during the operation of said camera.

4. In a film marking device, the combination of: a camera, there being a film carried in said camera adapted to move by the objective of said camera and to receive light impressions through said objective; a filter disc having filters which are arranged to move in the path of said objective for the purpose of controlling color value light impressions propagated to said film; a light transmitting flag of the same color as one of said filters, said flag being adapted to move across the path of said objective; and mechanism operatively connected to said camera for moving said flag into the path of said objective during a change of speed in the operation of said camera.

5. In a film marking device, the combination of: a camera, there being a film carried in said camera adapted to move by the objective of said camera and to receive light impressions through said objective; a shaft synchronously connected to said camera and arranged to rotate when said camera operates; a flag carried by said shaft, said flag moving into and out of the path of said objective; and mechanism for moving said flag across the path of said objective when said camera changes its speed of motion.

6. In a film marking device, the combination of: a camera, there being a film carried in said camera adapted to move by the objective of said camera and to receive light impressions through said objective; a shaft synchronously connected to said camera and arranged to rotate when said camera operates; a flag frictionally carried by said shaft, said flag being moved across the path of said objective as said shaft accelerates to normal rotation; and means for returning said flag across said path when said shaft retards in rotation.

In testimony whereof, I have hereunto set my hand at Los Angeles, California, this 27th day of March, 1925.

WILLIAM M. THOMAS.